(12) United States Patent
Semal

(10) Patent No.: US 6,647,429 B1
(45) Date of Patent: Nov. 11, 2003

(54) METHOD AND APPARATUS FOR INTERCONNECTING TOKEN RING LANS OPERATING IN ATM

(75) Inventor: Pierre Semal, Louvain-la-Neuve (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1044 days.

(21) Appl. No.: 08/706,114

(22) Filed: Aug. 30, 1996

(30) Foreign Application Priority Data

Sep. 1, 1995 (DE) .......................................... 195 32 422

(51) Int. Cl.⁷ .............................................. G06F 15/16
(52) U.S. Cl. ........................................ 709/251; 709/249
(58) Field of Search ............................. 395/200, 79, 81

(56) References Cited

U.S. PATENT DOCUMENTS

| | | | |
|---|---|---|---|
| 4,949,340 A | | 8/1990 | Smith et al. ................... 371/8.2 |
| 5,434,863 A | * | 7/1995 | Onishi et al. ................ 370/402 |
| 5,444,692 A | * | 8/1995 | Basso et al. ................. 370/402 |
| 5,548,589 A | * | 8/1996 | Jeon et al. ................... 370/399 |
| 5,550,816 A | * | 8/1996 | Hardwick et al. ........... 370/397 |
| 5,612,959 A | * | 3/1997 | Takase et al. ................ 370/390 |
| 5,631,908 A | * | 5/1997 | Saxe .......................... 370/235 |

FOREIGN PATENT DOCUMENTS

DE   4002022 A1   7/1991

EP   0641105 A2   3/1995

OTHER PUBLICATIONS

Tsukakoshi et al., "Large–scale and High Speed Interconnection of Multiple FDDIs using ATM–based Backbone LAN", IEEE, Jan. 1992.*

One World Through Communications, Florence, May 4–8, 1992, BD. 3 of 3, Jan. 1992, Institute of Electrical and Electronics Engineers, Large–Scale and High–Speed Interconnection of Multiple FDDIS Using ATM–Based Backbone Lan, pp. 2240–2298, Masato Tsukakoshi, et al.

* cited by examiner

Primary Examiner—Mehmet B. Geckil
(74) Attorney, Agent, or Firm—Laurie E. Gathman

(57) ABSTRACT

The invention relates to a local area network operating according to the asynchronous transfer mode (ATM) for transmitting cells, comprising a plurality of network interfaces. At least two ring systems are provided which comprise each two network interfaces (85, 89; 86, 90) and respective bridge connections (83, 84; 87, 88). A first network interface (85) of a first ring system and a first network interface (86) of a second ring system are coupled via first bridge connections (83, 84) to the two ring systems for transporting the cell stream to the two ring systems, and a second network interface (89) of the first ring system and a second network interface (90) of the second ring system are coupled via second bridge connections (87, 88) for transporting the cell stream to the two ring systems.

4 Claims, 4 Drawing Sheets

METHOD AND APPARATUS FOR INTERCONNECTING TOKEN RING LANS OPERATING IN ATM

BACKGROUND OF THE INVENTION

The invention relates to a local area network operating in the asynchronous transfer mode (ATM) for transmitting cells, comprising a plurality of network interfaces.

A Local Area Network (LAN) operating in the asynchronous transfer mode is known from EP-0 641 105 A2. This network comprises a plurality of stations and assigned network interfaces which comprise each a send and receive ring connection. Via the ring structured in this fashion, cells are transmitted which contain address information about the point of destination, for example, a specific station. A network interface comprises a switch and a controller. The switch comprises a path memory assigned to the receive ring connection and a path memory assigned to a receive station connection. When a cell is received, the respective switch or coupling operations are carried out in the switch based on the path memories. For example, an arriving cell is conveyed to the controller, to the station and/or to the ring on the basis of the address information.

When an asynchronous transfer mode is used in a system, payload information, for example, television, picture or sound signals, are sent in fixed-length blocks along digital signal processing arrangements. A cell containing a given number of bytes (for example, 53 bytes) is denoted a fixed-length block. Each cell comprises a header field with a length of, for example, 5 bytes and an information field in which the payload information is accommodated having a length of, for example, 48 bytes. In such a header field are contained address information, data for error detection and data for control information. Address information comprises trunk identifiers and link identifiers. The link identifier, also referenced VCI (Virtual Channel Identifier) contains the indication about the destination of the cell in the system. For transmitting a cell, a virtual channel is rendered available based on the virtual channel identifier. As a rule, a VCI is changed each time a switching point is arrived at. A group of a plurality of virtual channels is denoted a virtual path. A virtual path is featured by the trunk identifier. Such a virtual path is referenced a VPI (Virtual Path Identifier). Cells are assigned to successively determined time slots. The duration of such a time slot depends on the clock frequency used as a basis for the switching components. If no payload information is available, empty cells are transmitted in such a time slot i.e. cells without payload information. Cells containing payload information are referenced payload cells.

The local area network known from EP 0 641 105 A2 comprises only a single ring system and does not provide any possibility of exchanging cells via a plurality of ring systems. A ring system may then comprise one ring or two rings for cell streams of the opposite direction. A ring comprises a closed signal path via a plurality of network interfaces.

From DE 40 02 022 A1 is known a method and arrangement for the highly available transmission of data between two bus systems operating according to the token passing principle. The two bus systems are connected via two coupling paths provided for exchanging data. One switching path is active and the other is in the stand-by mode. The switching path in the stand-by mode checks the regular transfer of tokens of the active switching path. When the active switching path fails, the switching path operating in the stand-by mode thus far is activated. In this way, always only a single switching path is active in this arrangement.

SUMMARY OF THE INVENTION

Therefore, it is an object of the invention to provide a local area network operating in the asynchronous transfer mode, in which also an exchange of cells between link systems is possible.

The object is achieved by a local area network of the type defined in the opening paragraph working in the asynchronous transfer mode, in that at least two ring systems comprising each two network interfaces are provided, which ring systems comprise each at least one bridge connection; and in that a first network interface of a first ring system and a first network interface of a second ring system are coupled via at least a first bridge connection for transmitting the cell stream between the two ring systems, and a second network interface of the first ring system and a second network interface of the second ring system are coupled via at least a second bridge connection for conveying the cell stream between the two ring systems.

The local area network according to the invention comprises at least two ring systems with one or two rings. Cells can be transmitted via respective first network interfaces from one ring system to another ring system. The two first network interfaces are then coupled via at least one bridge connection. The first and second ring systems contain each also second network interfaces which are coupled via at least a second bridge connection. The cell stream may thus flow either via the first or the second network interface. If one bridge connection fails, the cell stream can flow through the other bridge connection when the measures according to the invention are implemented.

If there is an interruption of the first bridge connections, the first network interfaces are not provided to convey cells whose destination is the other ring system to that other ring system. Similarly, if there is an interruption of the second bridge connections, the second network interfaces are not provided to convey cells whose destination is the other ring system to that other ring system. The network interface which is assigned to an uninterrupted bridge connection thus no longer allows any cell to flow to the bridge connection, but conveys a cell onto the ring.

In a further embodiment of the invention there is provided that a first or second network interface comprises a switch for switching at least one receive and one send ring connection and two bridge connections, in that a receive ring connection and a bridge connection are assigned each a path memory for controlling the paths in the switch after address information has been taken from the header field of a cell, and in that the path memories of the first and second network interfaces of a ring system have like contents. Since the path memories in the network interfaces of a ring system have the same contents, the cell stream can be conveyed without delay via a second bridge connection if a first bridge connection fails.

The invention also relates to a method of transmitting cells in a local area network operating in the asynchronous transfer mode (ATM), which network comprises a plurality of network interfaces. For this purpose, cells are transmitted between a first network interface of a first ring system and a first network interface of a second ring system via at least a first bridge connection, and between a second network interface of the first ring system and a second network interface of the second ring system via at least a second bridge connection.

These and other aspects of the invention will be apparent from and elucidated with reference to the embodiments described hereinafter.

DESCRIPTION OF THE PREFERRED EMBODIMENT

Figure 1:
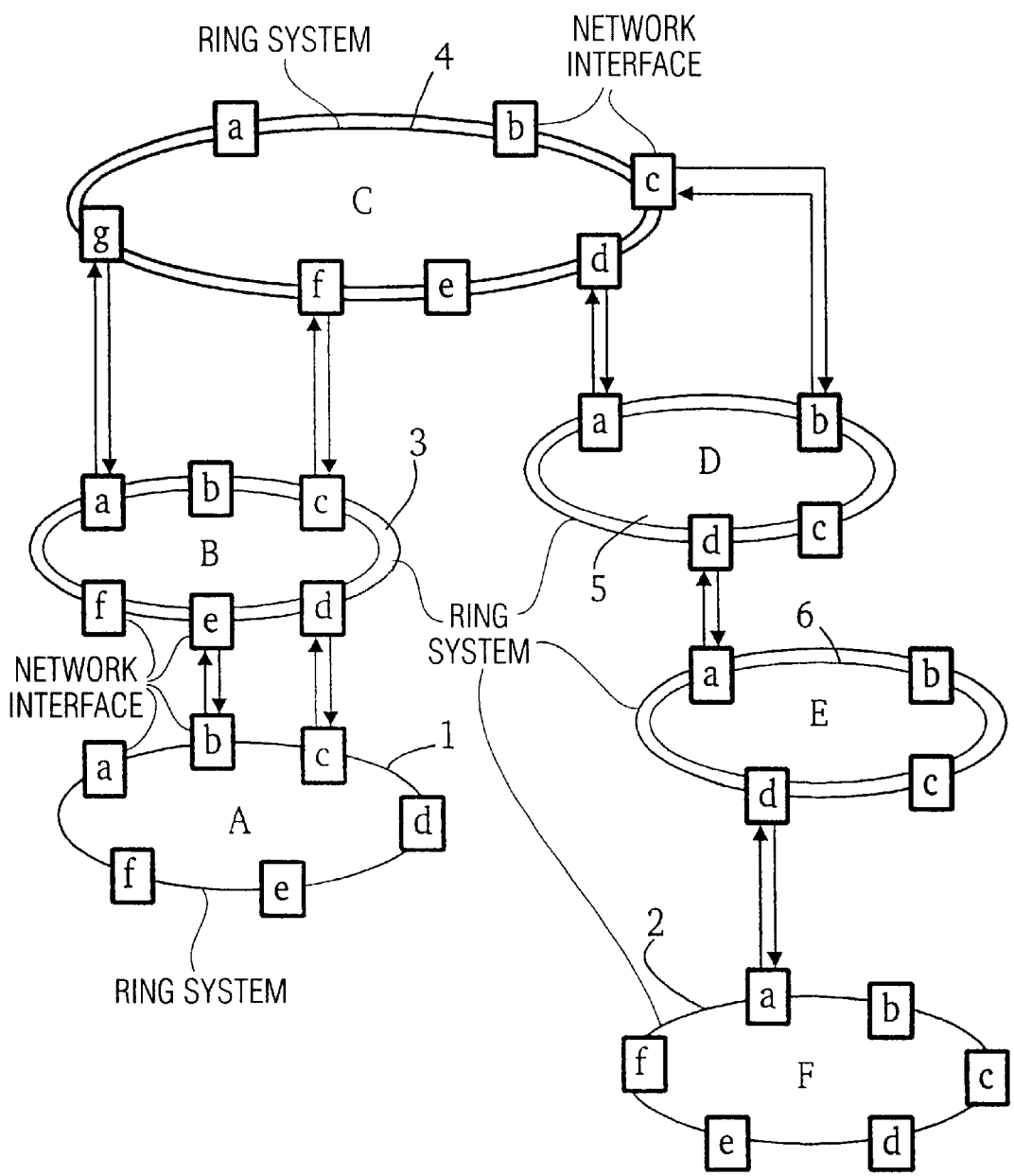
FIG. 1 shows a local area network.

FIG. 1 shows an illustrative embodiment of a local area network comprising six ring systems 1 to 6. A ring system 1 to 6 may either comprise one or two rings. The ring systems 1 and 2 contain one ring and the ring systems 3 to 6 contain two rings. A ring represents a closed signal path via a plurality of network nodes. The ring systems 3 to 6 form each two oppositely directed rings i.e. the signals run in the rings in opposite directions. A network node shown as a rectangle in the ring systems 1 to 6 comprises a network interface with two or four ring connections and two bridge connections.

Either a station or a network interface of another ring system is connected to the bridge connections. For example, a total of three network interfaces to stations and four network interfaces to the network interfaces of the ring systems 3 and 5 are connected for the ring system 4 in FIG. 1. A station may be, for example, a video telephone, a Personal Computer or a workstation or telephone, respectively. The messages, i.e., information signals, originating from the stations or network interfaces respectively, are transmitted in the asynchronous transfer mode by means of cells. A cell contains a header field of, for example, 5 bytes and an information field of, for example, 48 bytes. The information contained in the header field of the cell is used specifically for addressing and for executing switching functions. Each network node is furthermore coupled to a network management system (not shown) for controlling the local area network.

Figure 2:
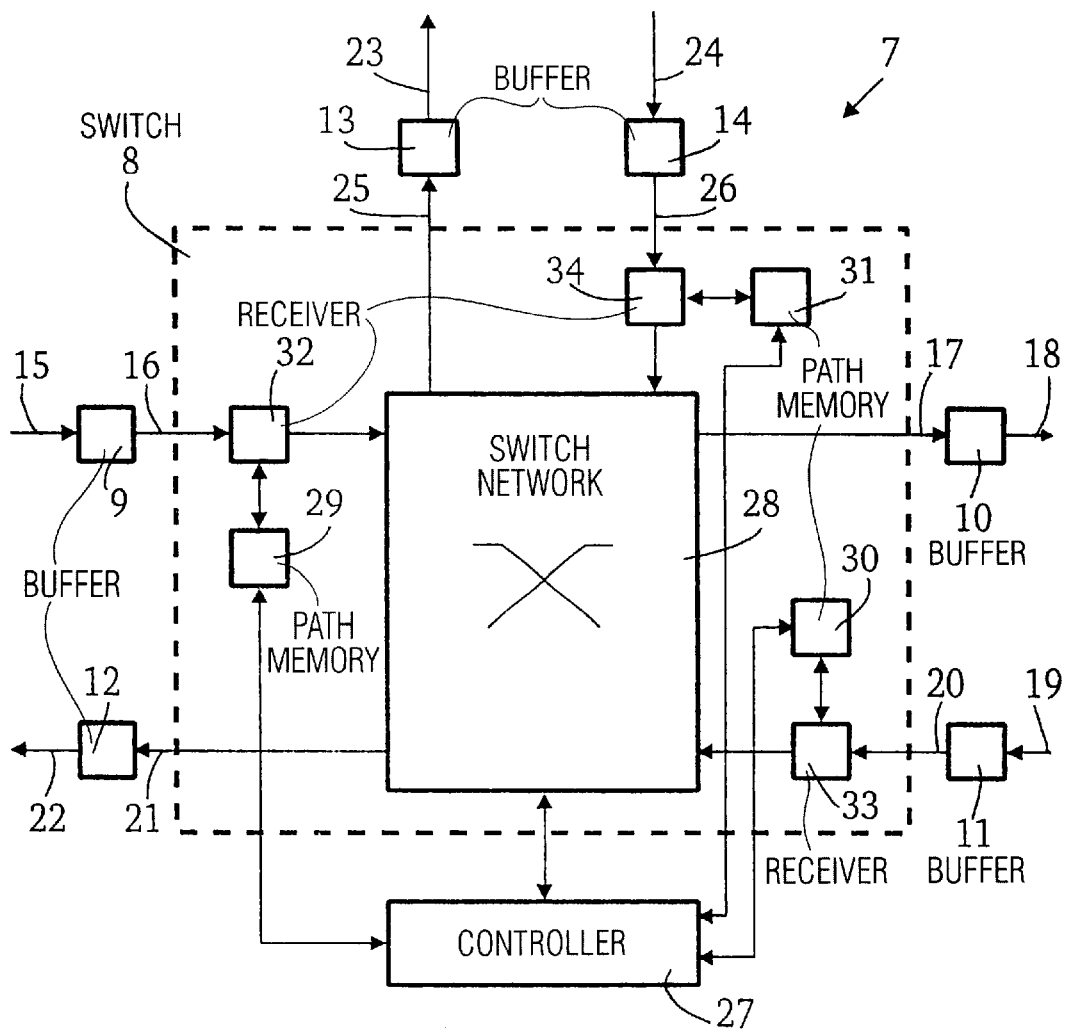
FIG. 2 shows a network interface with four ring connections, suitable for use in the local area network as shown in FIG. 1.

A network interface 7 with 4 ring connections is shown in detail in FIG. 2. The network interface 7 comprises a switch 8 which is coupled to ring and bridge connections via buffer stores 9 to 14 and transfers the cell stream.

The buffer store 9 is connected, on the one hand, to a receive connection 15 of a first ring and, on the other hand, to a connection 16 which leads to the switch 8. The buffer store 9 further receives the first receive clock signal which is derived from the cell stream of the receive ring connection 15, and an internal clock signal from a clock generator of the network interface 7. The buffer store 10 is coupled to the switch 8 via a connection 17 and applies a cell stream to a send ring connection 18 of the first ring. The buffer store 10 is supplied with the internal clock signal and a first send clock signal which is derived, for example, from the internal clock signal.

The buffer store 11 receives a cell stream from a receive ring connection 19 of a second ring and supplies a cell stream to the switch 8 via a connection 20. From a connection 21 of the switch 8, the buffer store 12 receives cells which are transported to a send ring connection 22 of the second ring. The buffer store 11 receives a second receive clock signal which is derived from the cell stream of the receive ring connection 19, and the internal clock signal. The buffer store 12 is supplied with the internal clock signal and a second send clock signal derived, for example, from the internal clock signal.

A bridge connection 23 is coupled to the network interface 7 via the buffer store 13, and a bridge connection 24 via the buffer store 14. The buffer store 13 which receives a cell stream from the switch 8 is coupled to the switch 8 via a connection 25. The buffer store 13 is also supplied with the internal clock signal and with a first station signal, as required, from a station connected to the bridge connections 23 and 24. The buffer store 14 which is supplied with a cell stream from a network interface of another ring system or station, is coupled to a station or to a network interface of another ring system via the bridge connection 24, and to the switch 8 via a connection 26. This buffer store 14 receives, as required, a second station signal from a station and the internal clock signal. In the buffer stores 9 to 14, the cell stream is adapted to a clock signal. The deriving of the various clock signals from the cell stream and the generation of the internal clock signal in the clock generator are not further shown here. The station clock signals may be, for example, equal to the internal clock signal. In that case, no buffer stores 13 and 14 are necessary.

The network interface 7 further includes a controller 27 controlling the switch 8, which controller is used, for example, for setting up or breaking off the connection. The controller 27, which may be realized as a microprocessor, may also receive and generate cells.

The switch 8 further includes a switching network 28, three path memories 29, 30, 31 and three receiving circuits 32, 33 and 34. In the receiving circuits 32, 33 and 34 are evaluated the header fields of cells arriving via connections 16, 20 and 26.

Address information contained in the header field is used for controlling various Tables for the path memories 29, 30 and 31 connected to the receiving circuits 32, 33 and 34. The data stored in the Tables are used by the respective receiving circuits 32, 33 and 34 to organize the further processing and transport of the cells. For example, the receiving circuit 32 can copy the cell and provide it with new address information. The original cell is sent, for example, to the bridge connection 23 via the switching network 28, whereas the copied cell is sent to the buffer store 10 via the switching network 28. There is another possibility in that the switching network 28 carries out this copying function.

The receiving circuit 32 is coupled to the buffer store 9 via the connection 16 and transports received cells to the switching network 28. The path memory 29 is connected to the receiving circuit 32. The receiving circuit 33 is connected to the path memory 30, receives cells from the buffer store 11 and conveys cells to the switching network 28. Between the switching network 28 and the connection 26 there is inserted the receiving circuit 34 which is connected to the path memory 31.

Two types of payload cells are transmitted via the ring connections 15 and 18 of the first ring and via the ring connections 19 and 22. On the one hand, user cells which contain, for example, messages or data of the user of a previously established connection in their information field, and, on the other hand, control cells which contain overhead bytes in their information field.

Figure 3:
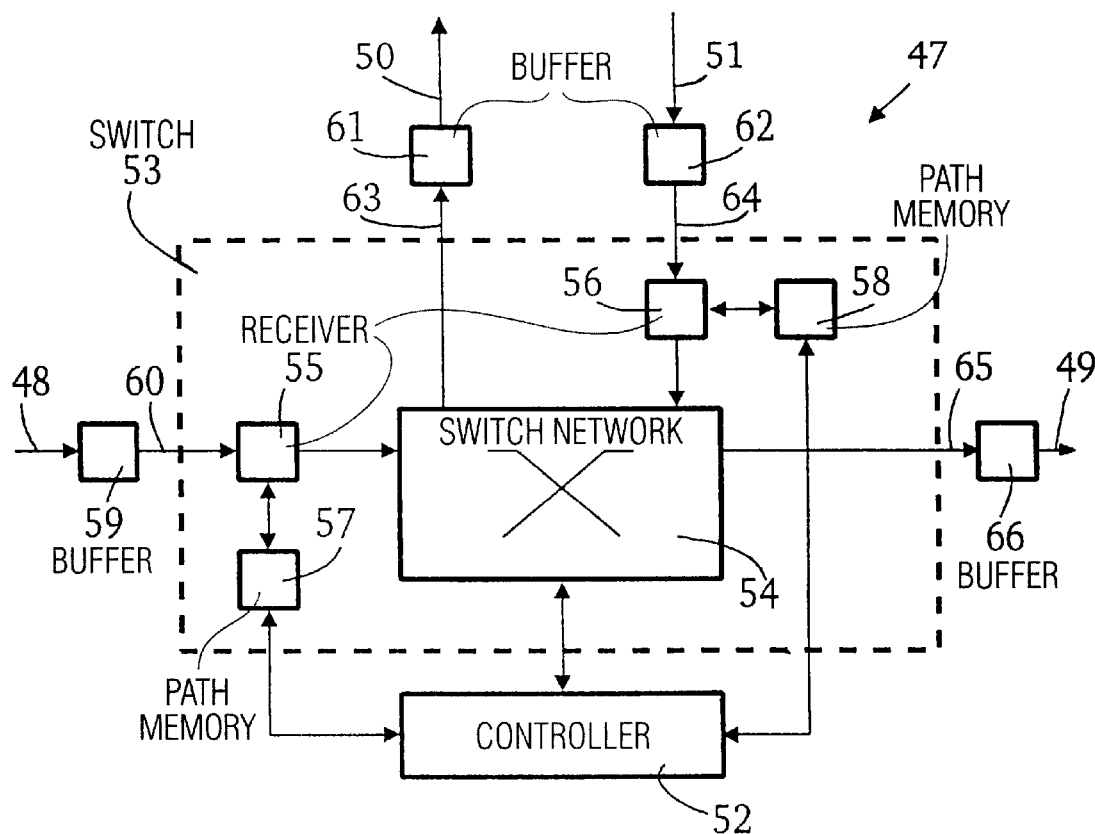
FIG. 3 shows a network interface with two ring connections, suitable for use in the local area network as shown in FIG. 1.

FIG. 3 shows a network interface 47 with two ring connections 48 and 49. The network interface 47 operates in similar manner to the network interface 7 of FIG. 2. With this network interface, cells are transmitted between the ring connections 48 and 49, bridge connections 50 and 51 and a controller 52 by a switch 53. The switch 53 comprises a switching network 54, two receiving circuits 55 and 56 and two path memories 57 and 58. The ring connection 48 is coupled to the receiving circuit 55 via a buffer store 59 and a connection 60. The receiving circuit 55, which is coupled to the path memory 57, transports received cells to the switching network 54. The path memory 57 applies, as required, new overhead bytes for the header field of the received cell to the receiving circuit 55. The switching network 54 is furthermore coupled to the ring connection 49 via a connection 65 and a buffer store 66.

The bridge connections 50 and 51 are connected each to buffer stores 61 and 62, respectively. The buffer store 61 is supplied with cells from the switching network 54 via a connection 63. Between the buffer store 62 and the switching network 54 is inserted the receiving circuit 56 which is coupled to the path memory 58. The receiving circuit 56 and buffer store 62 are coupled via a connection 64. The controller 52 is used for controlling the path memories 57 and 58 and receives at least cells from the switching network 54.

Figure 4:
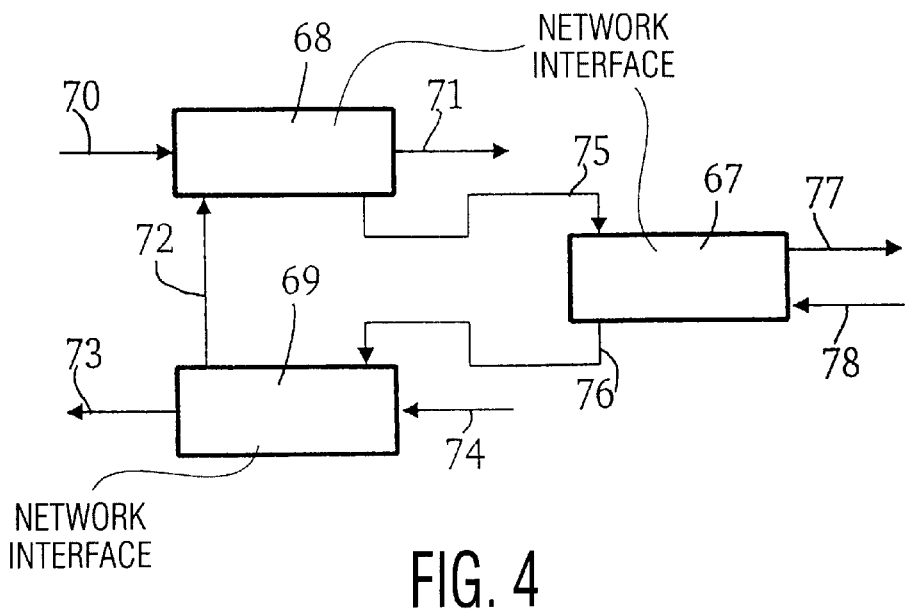
FIG. 4 shows a network interface with four ring connections, comprising three network interfaces with two ring connections each.

A network interface with four ring connections as shown in FIG. 2 may also be formed from three network interfaces with two ring connections each, as is shown in FIG. 3. In FIG. 4 are shown three network interfaces 67, 68 and 69. The ring connections 70 and 71 of the network interface 68 and the ring connections 73 and 74 of the network interface 69 also form ring connections when they are connected. The bridge connection 76 of the network interface 68 is the ring connection of the network interface 67 whose bridge connections 77 and 78 are also the bridge connections in this arrangement. The bridge connection 75 of the network interface 68 is the ring connection of the network interface 67, whose bridge connections 77 and 78 are also the bridge connections in this arrangement. The further ring connection of the network interface 67 is connected to the bridge connection 76 of the network interface 69. The bridge connection 72 further connects the two network interfaces 68 and 69.

A network interface thus conveys cells from one ring connection to another ring connection of the same ring, to a bridge connection or station connection, or also to the ring connection of the other ring if there are four ring connections. A cell on a bridge or station connection is transported to a ring connection. Cells may also be sent and received by the controller of the network interface.

Certain bits in the header field of a cell are reserved for the VCI (Virtual Channel Identifier). According to standardization recommendations, this identifier contains the destination of a cell and thus denotes a virtual channel. Furthermore, certain bits in the header field of the cell are reserved for the VPI (Virtual Path Identifier), which indicates a group of a plurality of virtual channels. According to current standardization regulations, 8 bits in the header field of the cell are reserved for the VPI and 16 bits for the VCI.

The VCI and the VPI in this illustrative embodiment are provided for different information than in the Standardization Recommendations. The VPI contains information about the address (address information) i.e. the destination (network node) of a cell in a ring system. The VCI is used for indicating the user-related identification for a channel, the type of channel and the type of cell. Furthermore, the VCI is used as an address for a ring system.

A controller 27 of a network interface 7 or a controller 52 of the network interface 47 controls the connection set-up of one assigned station to other stations. The respective control operations for the setting up and breaking off of connections may be taken, for example, from European Patent Application EP 0 641 105 A2.

The path memories 29 to 31 of the network interface 7 and the path memories 57 and 58 of the network interface 47 respectively, contain information which is evaluated by the assigned receiving circuits 32 to 34 and 55 and 56 respectively, to organize the further processing and transporting of the received cells. For example, a cell may be given a different address, may be copied or erased. The path memories 29 to 31 and 57 and 58 respectively, may be changed by the respective controllers 27 and 52, for example, in the case of a failure or in reaction to specific information from the network management system.

In the case of a connection between a network node of a first ring system and a network node of a second ring system, the VPI and the VCI are to be changed if one cell goes from one ring system to another. For this purpose, entries corresponding to the connection set-up are made in the path memories. It is assumed that cells are to be sent from the ring system B of the network node f(B,f) to the ring system F of the network node d (F,d) (FIG. 1). The following path is then laid down: (B,f)-(B,c)-(C,f)-(C,d)-(D,a)-(D,d)-(E,a)-(E,d)-(F,a)-(F,d). A cell generated by the network node f of the ring system B is given the address (C,f) and is transmitted via the network nodes e and d to the network node c of the ring system B and via the associated bridge connections to the network node f of the ring system C. In the network node f of the ring system C, the address (C,f) is substituted with a new address (D,a). Subsequently, the cell reaches via the network nodes e and d of the ring system C the network node a of the ring system D. After a new address (E,a) has been inserted, the cell runs through the network node d of the ring system D to the network node a of the ring system E. Before the cell enters the last ring system F, a new address (F,a) is inserted into the header field of the cell and the cell is passed on via the node d (ring system E) to the node a of the ring system F. After a further transfer, the cell reaches network node d via the network nodes b and c of the ring system F.

If an error occurs in the local area network, the network node detecting the error and the network management system carry out various measures. For example, a ring connection or a bridge or station connection may be interrupted or a network node may fail. A network interface detecting such an error announces this error to the network management system. The controller of a network interface detects such an error, for example, after it has sent out control cells which are not received back or through a loss of synchronization. After an error message has been received, the network management system renders this error information available, so that path memories in the network interfaces can be changed accordingly by the associated controller.

If an error occurs in a ring connection between two network interfaces, the network interface no longer receiving any further cells owing to the error informs the network management system. The network interface sending the cells switches to a loop after receiving the error information from the network management system. This means that all the cells that are to be sent via the defective ring connection are sent to the ring connection of the other ring via a loop. However, this can only be effected with a network interface having four ring connections. In another case, if a network interface has two ring connections, the cells will be erased.

Figure 5:
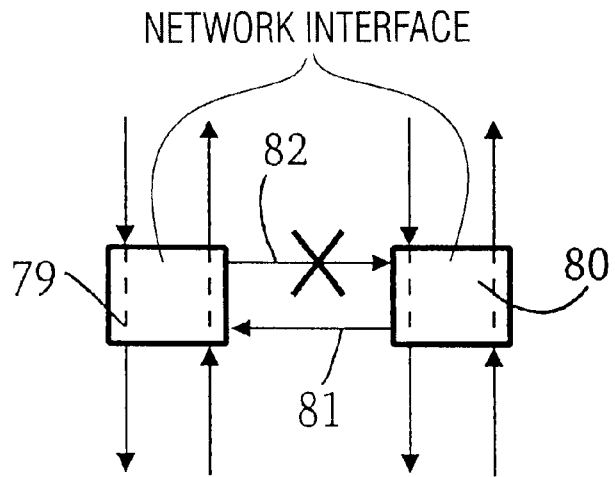
FIG. 5 shows two network interfaces of two ring systems, coupled via two bridge connections.

If there is an error in a bridge connection i.e. one or more lines between two network nodes of two ring systems are defective, a network node detecting the error informs a network management system. Furthermore, the entries in the path memories are changed in the network interfaces connected via the bridge connection. A cell which is to be transferred via the bridge connections, is then transported by the associated switches only via the ring and not to a bridge connection. For this purpose, an example with two interfaces 79 and 80 is shown in FIG. 5. A bridge connection 81 supplies cells from the network interface 80 to a first ring system of the network interface 79 of a second ring system. Normally, cells are passed on from the network interface 79 to the network interface 80 via the bridge connection 82. This bridge connection 82 is interrupted, for example. The cells are then no longer transferred via the bridge connections 81 and 82, but remain in the respective ring system where they are destroyed, if necessary, if there is no further connection between the two ring systems.

Figure 6:
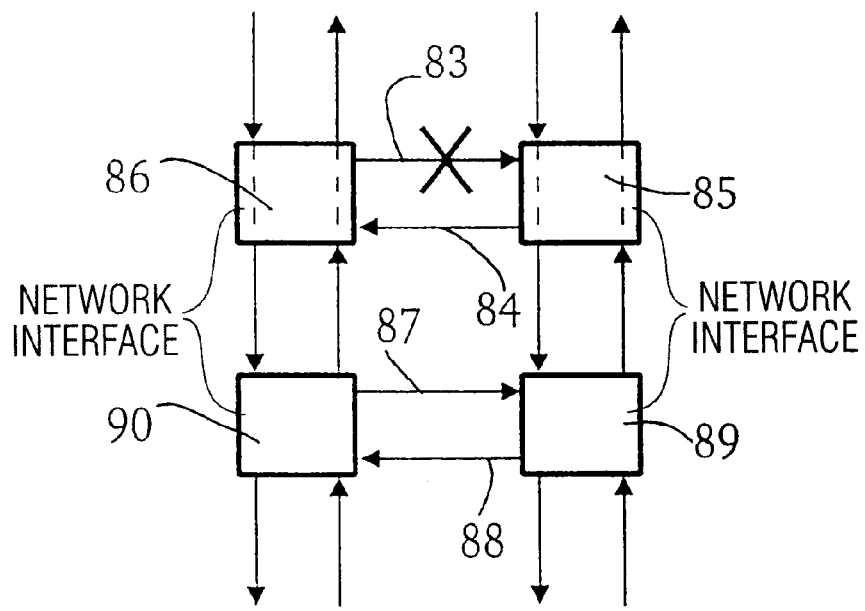
FIG. 6 shows four network interfaces of two ring systems, coupled via bridge connections.

FIG. 6 shows an example in which there is another bridge connection between two ring systems. A bridge connection 83 or 84 between a network interface 85 of a first ring system and a network interface 86 of a second ring system is assumed to be interrupted. Cells which are to go from one ring system to another via the bridge connections 83 and 84 are therefore transmitted via further bridge connections 87 or 88 between the network interface 89 of the first ring system and the network interface 90 of the second ring system. The path memories in the network interfaces 85, 86, 89 and 90 are arranged such that the two cells can be transmitted from one ring system to another. The path memories of the network interfaces 85 and 89 and of the network interfaces 86 and 90 have the same contents. Thus, in the event of one bridge connection failing, it is ensured that cells can be transmitted via further bridge connections between ring systems. In FIG. 6, the network interfaces 85, 86, 89 and 90 have four ring connections each. Alternatively, it is possible for network interfaces having two ring terminals each to be used.

What is claimed is:

1. A local area network operating in the asynchronous transfer mode (ATM) for transmitting cells, comprising a plurality of network interfaces, characterized in that at least two ring systems comprising each two network interfaces (85, 89; 86, 90) are provided which ring systems comprise each at least one bridge connection (83, 84; 87, 88) and in that a first network interface (85) of a first ring system and a first network interface (86) of a second ring system are coupled via at least a first bridge connection (83, 84) for transmitting the cell stream between the two ring systems, and a second network interface (89) of the first ring system and a second network interface (90) of the second ring system are coupled via at least a second bridge connection (87, 88) for conveying the cell stream between the two ring systems.

2. The local area network as claimed in claim 1, characterized in that if there is an interruption of the first bridge connections (83, 84), the first network interfaces (85, 86) are not provided to convey cells whose destination is the other ring system to that other ring system, and in that, if there is an interruption of the second bridge connections (87, 88), the second network interfaces (89, 90) are not provided to convey cells whose destination is the other ring system to that other ring system.

3. The local area network as claimed in claim 2, characterized in that a first or second network interface comprises a switch (8, 53) for switching at least one receive and one send ring connection (15, 18, 19, 22; 48, 49) and two bridge connections (23, 24; 50, 51), in that a receive ring connection (15, 19; 48) and a bridge connection (24; 51) are assigned each a path memory (30, 31, 32; 57, 58) for controlling the paths in the switch (7, 47) after address information has been taken from the header field of a cell, and in that the path memories (30, 31, 32; 57, 58) of the first and second network interfaces of a ring system have like contents.

4. A method of transmitting cells in a local area network operating in the asynchronous transfer mode (ATM), which network comprises a plurality of network interfaces, characterized in that cells are transmitted between a first network interface (85) of a first ring system and a first network interface (86) of a second ring system via at least a first bridge connection (83, 84), and between a second network interface (89) of the first ring system and a second network interface (90) of the second ring system via at least a second bridge connection (87, 88).

* * * * *